United States Patent [19]

Chen

[11] Patent Number: 5,253,607
[45] Date of Patent: Oct. 19, 1993

[54] ONE STEP MOLDED ALL PLASTIC BOAT AND MANUFACTURE OF THE SAME

[76] Inventor: Shijie Chen, Room 301, Building 35, Lianhuashan Residential Quarters, Zhuhai, Guangdong Province, China

[21] Appl. No.: 699,634

[22] Filed: May 14, 1991

[30] Foreign Application Priority Data

May 16, 1990 [CN] China .......................... 90102742.1

[51] Int. Cl.$^5$ ............................................. B63B 5/24
[52] U.S. Cl. ..................................... 114/357; 425/429
[58] Field of Search ........................ 114/56, 355, 357; 425/429, 430, 434, 435; 428/36.5, 318.6, 318.2, 318.9; 264/45.4, 45.7, 310

[56] References Cited

U.S. PATENT DOCUMENTS

| | | | |
|---|---|---|---|
| 3,840,926 | 10/1974 | Stoeberl | 114/357 |
| 4,247,279 | 1/1981 | Masters | 425/429 |
| 4,365,580 | 12/1982 | Blount | 114/357 |
| 4,741,284 | 5/1988 | Madison | 114/357 |

FOREIGN PATENT DOCUMENTS 2150892 7/1985 United Kingdom ................ 114/357

*Primary Examiner*—Jesus D. Sotelo
*Attorney, Agent, or Firm*—Larson and Taylor

[57] ABSTRACT

This invention relates to a one-step formed all-plastic boat, the entire hull of which is comprised of plastic material that contains in addition small amounts of an additive and a filler. The hull has a cavity, divisional cavities, open and closed compartments, but no welded parts. The process of manufacturing the all-plastic boat comprises feeding physically modified resinous material into a closed container type boat mold, subjecting the mold to a complex motion of circular and semicircular rotations of 360°-180° and rockings of selected positional angles; applying an operational heat treatment at 200°-450° C. to the mold while the mold undergoes the complex movements; and after heat treatment, cooling the mold and then releasing the entire all-plastic boat.

16 Claims, 2 Drawing Sheets

ONE STEP MOLDED ALL PLASTIC BOAT AND MANUFACTURE OF THE SAME

FIELD OF THE INVENTION

This invention is related to the manufacture of molded, plastic structures and, more specifically, is related to the manufacture of all plastic structures, such as boats, that are molded.

BACKGROUND OF THE INVENTION

Prior art small boats for river, lake and coastal transportation, general carriage, military utility and recreational purposes, are generally wooden structures, metallic structures, concrete structures, and fiber glass structures. In addition, a powerless mini yacht has been made of plastic.

There are many disadvantages of the above stated boats, and they include the following.

1. Wooden boats: are mostly for general utility purposes with complicated and cumbersome manufacturing technology, are easily damaged and are subjected to rotting because of a very strong water absorption.

2. Ferrous metal ships: are limited to larger type marine transportation vehicles having a hull made of large specific weight material. After being used for a longer period of time, repeated depositions and suspensions, such as aquatics shells, adhere onto the hull surface below the water line and erosion and etching of the metal occur.

3. Non-ferrous metal boats: have a high manufacturing cost and a poor antishock capability, are easily eroded and are incapable of being popularly used.

4. Concrete boats: have hull made of specific weight material that can be easily damaged and fractured and have a poor antishock or ability to withstand shock. They are also heavy and are generally not very practical.

5. Glass fibre boats: have a hull of high specific weight material that is easily damaged; they can become easily dilapidated or delaminated and fractured; they have a poor antishock capability; and they are especially difficult to be maintained and repaired. Because of a complicated manufacturing technology, they have a high manufacturing cost, similar to an aluminum reinforced sandwich boat (refer to U.S. Pat. No. 4,365,580 and also Soviet Union Patent 43764).

6. Powerless mini plastic yacht: manufactured by conventional rotational forming technology with a single kind of plastic material for the hull and shaped with a cope and dray mold. They have the simplest construction and utilize plates having the same thickness; they have poor rigidity and are made without a cavity, hold or cellar, port and cabin. In general they are merely used as rowing mini yachts that can hold a load of no more than 200 kilograms.

In the United States, there is an all-plastic boat made of reinforced soft plastics, but merely made from a reinforced concave mold, which needs to be reinforced by metal structural members and beams and has but an extremely simple and small hull (refer to U.S. Pat. No. 4,495,884 and U.S. Pat. No. 4,741,284). Also in the United States, there is another process for preparing an all-plastic boat using a rigid mold wherein resin-soaked glass fibre cloth is multi-laminated on a preformed mold or a stack mold. Alternatively, resinous as well as glass fibre cloth can be successively coated in steps and then allowed to solidify. However, this process is uneconomical, and requires a lot of time and energy, and further it is not very well mechanized. See for example, U.S. Pat. Nos. 4,495,884, 4,365,580, 4,913,944 and 4,247,279 incorporated herein by reference.

In U.S. Pat. No. 4,247,279 there is disclosed a rotational molding system in which a pair of large boat molds carried on separate carriages are alternately heated in a double open-ended oven having opposing cantilevered side sections for receiving concentric drive arrangements. The molds may be driven about two perpendicular axes in a rocking or full rotational motion. The mold is charged with a ground plastic powder, as the mold rotates in the presence of heat, the powder melts and sticks to the interior of the mold. After being solidified, the hull is released off from the mold. However, such a small boat has a simple construction without cellar, cavity, cabin and port, and has a maximum loading of 200 kilograms, as mentioned above.

U.S. Pat. No. 4,913,944 discloses a rotational molding method for making a laminated boat by successively releasing charges of particulate plastics in the mold cavity.

Further, Japan Patent 49-35067 discloses a process for manufacturing synthesized resin boat using a cope and dray mold for a single step or once-for-all hull forming and molding. However, between two separate plates there is used an expansion bag into which foaming resinous liquid is injected. The hull size is much constrained by the expansion bag, the hull construction cannot be too complicated, and it is difficult to carry out the injection.

There are also other Japan, Russian and German patents concerning plastic or glass fibre boat reinforced by metallic members; however, they are not all-plastic, nor made in a single step and they have a maximum load capacity of 200 kilograms.

Substantial improvements are needed to address the problems, disadvantages and drawbacks of the boat manufacturing discussed above.

SUMMARY OF THE INVENTION

This invention is for a novel type of boat hull or boat and the manufacture of the same and, more specifically, to a once-for-all or one-step or single-step, all-plastic boat and the manufacture of a boat hull or boat in a single molding step.

Accordingly, an important object of the present invention is to provide an all-plastic boat made in a single step.

Another object of the present invention is to provide an all-plastic, single-step formed boat, the hull of which can weigh 100 kg., 300 kg., or 400 kg. or even above 500 kg. (for example 2,000 kg), can have a hull length of 2.5–12 meters or above (for example 30 meters), and can have a load of 200 kg., 600 kg., 800 kg., as well as 1,000 kg. or more (for example 5,000 kg.). Such boats can be used for river, lake, coastal transportation, carriage, and military utility, as well as used for sports. This boat, in a preferred embodiment, is manufactured by a new technology, and new material according to new principles, and when made, is strong enough to be driven by a 2–200 H.P. motor.

Yet another important object of the present invention is to provide an improved system for manufacture of the once-for-all or single step formed, all-plastic boat.

According to one embodiment of the all-plastic, single step formed boat, plastic powders or synthetic resins such a LLDPE, LDPE and various other kinds of polyolefins, are used as the main material and part of particulate additive such as ABS as well as glass fiber fillers are added to form a physically modified resin material. Then a required amount of said material for manufacturing an entire boat is injected into a "sealed container type" or "closed container" boat mold made of metallic sheet. Said boat mold is now positioned on a rotational forming machine for the heat treatment corresponding to desired forms. Said heat treatment means is such that different heat treatments are carried out according to different theoretical thicknesses at different positions for different hull sizes and different performances. The boat mold of the "sealable container type" is placed under an operational heat treatment and is subjected to a complex motion comprising circular and semicircular rotations of 360-180 degrees and rockings of certain positional angles. Under the heat treatment, which can be done at exemplary temperatures of 200° C.–400° C., the physically modified plastic powder material in said boat mold becomes molten and layered onto the inside surface of the mold thereby forming a resin lamination of a certain thickness. Finally, the "sealed container type" boat mold having formed a resin lamination thereof is set into a cooling machine to be cooled. When the normal temperature is reached, the mold is released or removed and the all-resin, single-step boat is ready.

The all-plastic boat itself is formed in a single-step with reasonable required differential thickness distribution, said differences reaching 2-20 mm; cavity, cavities, open and closed compartments etc. are accommodated therein. There is no necessity for welding or installing a keel, keelson, rib plates, transom or metallic ribbed member or any reinforcements at all.

Boats or ships having large hulls and large load capacities which are designed to travel at super-high speeds can be made pursuant to the present invention. In such cases, the manufacturing steps comprise the following. Resin raw material is used as the main material, parts of additives and fillers are added to form a physically modified resin raw material. The modified resin raw material together with a resin main material, part of the additive and 1%-10% (in terms of the weight of the resin) glass fibre filler is particulated and atomized or pelletized to form a physically modified crude powder material. Then said crude powder material is fed batchwise into said "sealed container type" boat mold in successive steps. Finally, the mold with the material is positioned on the rotational molding machine to be melted and plasticized under corresponding heat treatment corresponding to the sectional tracking of the hull shape and a multi-layered hull having surface layer and fiber layer is thus created. In order that there will be an optimum coalescence or linkage between the foaming material in the hull cavity and the hull surface layer, a physically modified resin material comprising longer glass fibers or other fibers can be utilized during processing the innermost layer of the fibre layers to form a medium interconnecting the hull surface layer and the foaming material so that the latter will not be internally separated or disconnected from the hull itself. As this invention employs the "closed container type" boat mold made of metallic sheet, reasonable required changes of the shape, the attachments and the size of the mold can be made, in combination with heat treatment and complex operational motion to vary the fluidity of the physically modified resin material in the mold as it is being melted and plasticized so as to form the divisional cavities and open and closed compartments of the all-plastic boat. Further, the rigidity and strength of the hull can be improved by means of the constraint effect of the fibre layer on the internal foaming material and the internal adhesion between the surface layers. Additionally, as such "closed container type" boat mold is composed of several component molds, i.e., the hull main mold and the different shapes of hollow mold and core, so varieties of boats and ships of different types and different complicated shapes can be manufactured, such as the hulls having the pilot platform, sitting chair, meters cockpit, food box, fridge, fresh water reservoir, fresh eatables cellar, rest compartment and other installations. The present all-plastic boat technology can also be used to manufacture automobile frameworks, small aeroplane frames, pontoon bridges, buoyancy marks, houses, fishery mesh box, daily use cases and super large diameter (300 mm-3,000 mm) all-plastic piping etc.

In comparison with the prior wooden boat, metallic boat, non-ferrous alloy boat, concrete boat, glass fibre boat and powerless mini plastic yacht, the all-plastic boat of the present invention has the following merits:

1. The all-plastic boat is based on advanced one step molding, all-plastic process; its principle is creative, the theoretical thickness distribution of the hull is precise and reasonable and it has a large amount of buoyancy. Thus there is and thus little fear of such a boat being sunken.

2. The all-plastic boat is salt-proof, alkaline proof, acid proof and etching proof and aquatics and shells will not deposit onto its bottom.

3. The all-plastic boat can be crushed and remanufactured after being used for a lot of years; this is a merit far ahead of other kinds of boats.

4. The all-plastic boat has a large flexibility, a large anti-shock capability and nice non-magnetic performance.

5. The cavity, divisional cavities, the open and closed compartments, as well as the pilot platform and other installations, are all formed by a single step process without any welding; it is compact and stylistic, beautiful and elegant.

6. The all-plastic boat has different grades of loading weights, suitable for different requirements; in this respect, it is far ahead of prior art all-plastic boats.

7. The all-plastic boat has a low-cost, can be made in a simple processing, and is easy to be maintained and repaired with readily available raw materials.

Various other objectives and advantages of the present invention will become obvious to those skilled in the art as the details of the invention are more specifically set forth below.

DETAILED DESCRIPTION OF THE PREFERRED EMBODIMENT

Figure 1:
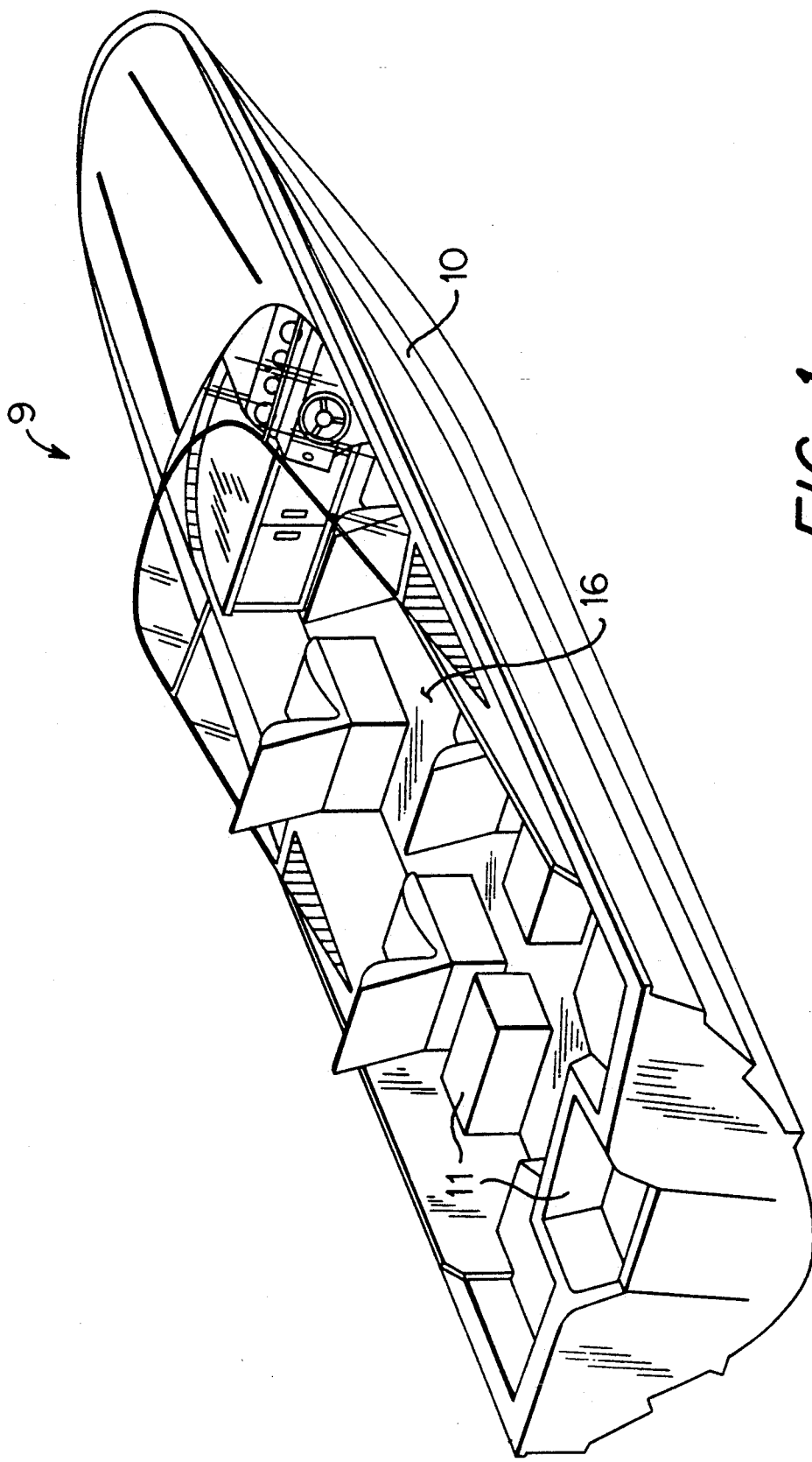
FIG. 1 is a perspective view of the entire boat of the invention.

With reference now to the figures in which the same numerals indicate the same parts throughout the several views, a boat 9 is depicted which is made according to the present invention. Boat 9 is comprised of plastic materials which are used as the main material in its construction. These materials include low plastic density polyethylenes (LDPE), linear low density polyethylenes (LLDPE) and various other kinds of polyolefines. Additives such as ABS and/or fillers are added therein to form a physically modified resin material. A required amount of the physically modified resin material for manufacturing an entire boat, the amount varying depending upon the boat size, is subjected and injected into a "closed container type" mold of the boat (not shown) made of metallic sheet. The mold for boat 9 is conventional and is described in the aforecited references. The boat mold containing the proper amount of the raw material is then positioned on a conventional rotational forming machine (not shown) which can be subjected to heat treatment corresponding to desired forms. Examples of such machines are also depicted and described in the cited references. While under the heat treatment, the mold undergoes or experiences a complex motion comprising circular and semicircular rotation and rockings of certain positional angles. The physically modified resin material is melted and layered onto the interior surface of the mold to form a resinous lamination of a certain thickness. After the resin lamination reaches the desired thickness, the mold is set onto a cooling machine to be cooled. When reaching the ambient temperature, the mold is released and the all-plastic boat is finished.

The plastic materials used in the present invention as the main material include, but not limited to, such as for example polyethylene, polypropylene, polyvinyl chloride, polyamide, nylon, polyester and among them the preferred main resin is low density polyethylene (LDPE). The most preferred main plastic powder is linear low density polyethylene (LLDPE). It is also preferred to use powder of these resins, especially the powder of LLDPE. For manufacturing the boat of the instant invention, the resin is used in the amount of from 85% to about 98% by weight of the entire boat 9.

The additives used in the present invention include antioxidant, fire retardant material, conventional heat stabilizer, light stabilizer, lubricant and filler. The additives used in the present invention are in a total amount of from about 2% to about 15% by weight of the entire boat. Among them, the heat stabilizer is used in an amount of about 0.5 to 2% by weight of the entire boat. The light stabilizer is used in an amount of about 0.25 to 3% by weight of the entire boat. The filler is used in an amount of about 1 to 10% by weight of the entire boat.

The temperature of the heat treatment is in a range from 200° C. to 450° C. A preferred temperature range is from about 290° C. to 350° C. The time of the heat treatment is in a range of from about 20 to 60 minutes. The temperature and the time of the heat treatment used for a specific shape boat are selected based on the designed thickness of the boat.

The mold used in the present invention is a sealed or closed container type boat mold shaped according to the design of the boat to be molded. The closed container type boat mold is made of metal sheet of a thickness from about 1 to 5 mm.

The cooling system used in the present invention is a combination of air blowing and water cooling. Although, either air blowing or water cooling can be used in the present invention, it is preferred to use the combination of them.

Figure 2:
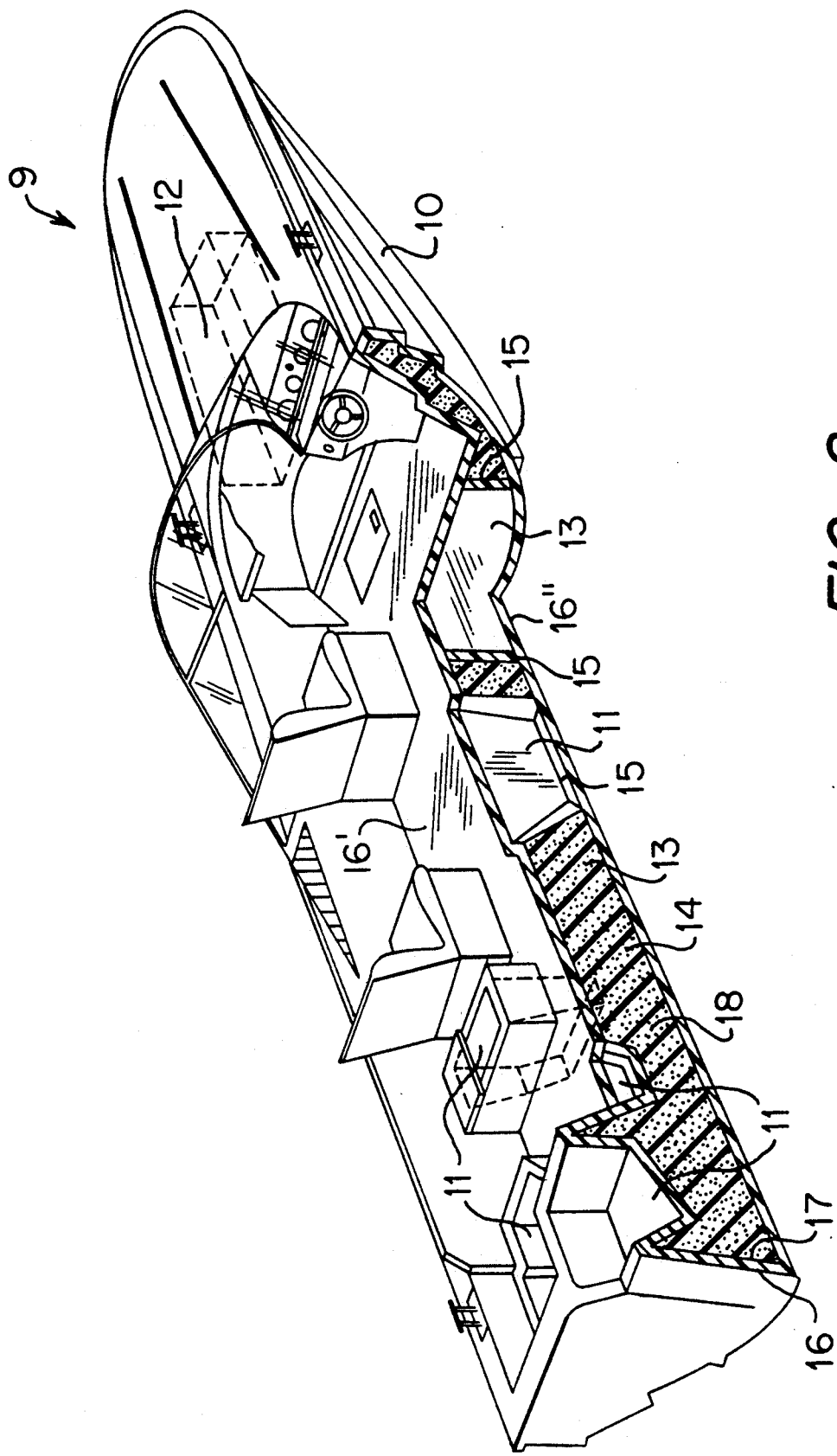
FIG. 2 is a perspective view, with parts in partial cross-section, of the boat of the invention.

Turning to FIG. 2, boat 9 is comprised of a hull 10 and a cabin or open compartments 11. Open compartments 11 are in parallel with the mold-releasing direction. Boat 9 further includes a port or compartment 12 which is vertical to the mold-releasing direction. Boat 9 is also provided with divisional cavities, a cellar or hold 13 and a cavity 14. Hull 10 has a plastic layer 16 formed while the hull is being formed which contacts the surface of the mold. Hull layer 16 has an inner surface layer 16' and an outer surface layer 16". Inner layer 16' is internally adhered onto its outer layer 16" at a location denoted by numeral 15. A fiber layer 17 has been formed on plastic layer 16 and a foaming material 18 fills cavity 14.

While the hull is being rotationally formed, the all-plastic boat is defined by inner surface layer 16' and outer surface layer 16", the entire all-plastic boat being formed in a single step or stage. The inner surface layer 16' has several cabins or open compartments 11 and closed compartments 12 and a cavity 14 is formed between inner surface layer 16' and outer surface layer 16". Cavity 14 has several divisional cavities or cellars 13 which are formed by the internal adhesion at locations 15 between inner surface layer 16' and outer surface layer 16". Foaming material 18 such as ABS is filled into cavity 14 or divisional cavity 13. The foaming material 18 adheres onto the surface layers and is constrained by the inner and outer surface layer 16' and 16" as a result of the protrusions from the fibre layer 17 providing a rough adhesion surface. In this way hull 10 will not become dilapidated or delaminated. Foaming material 18 used to fill the cavity 14 can be closed-porous foaming material so that a high buoyancy force can be maintained, even if outer surface layer 16" is broken and leaks, because the closed porous foam does not absorb water. As the hull structure is made into two layers with closed-porous foam filled therein, the overall specific weight of the hull materials is smaller than 1, so even if inner layer 16', outer layer 16" and foaming layer 18 are all penetrated or broken, a larger buoyancy force will still be maintained.

EXAMPLE 1

For a 300 Kg weight one-step all-plastic boat, 135 Kg LLDPE powder is mixed with 2 Kg heat stabilizer and 3 Kg light stabilizer resulting in a mixture of physically modified resin raw material. Another 135 Kg LLDPE powder is mixed with 2 Kg heat stabilizer, 3 Kg light stabilizer and 20 Kg short glass fiber resulting in a second mixture. The two resulted mixtures are then particulated and atomized pelletized by a conventional device to form physically modified material. The material is fed batchwise into a "closed container type" boat mold successive steps. The mold containing the material is positioned on a rotational molding machine. On the rotational molding machine, the mold is subjected to a complex motion comprising circular and semicircular rotational movements of 360°-180° and rockings of certain positional angles. While being subjected to this motion a heat treatment at a temperature of 320° C. is applied selectively to the mold for 40 minutes. Then, the mold is set onto a cooling machine to be cooled by a combination of air blowing and water spraying. When the temperature of the mold reaches to the ambient temperature, the mold is released and the completed boat is removed.

EXAMPLE 2

For an 800 Kg weight one-step all-plastic boat, the procedure as described as in Example 1 is followed, except that the total amount of LLDPE plastic powder is changed to 700 Kg, the amount of heat stabilizer is changed to 8 Kg, the amount of light stabilizer is changed to 16 Kg and the amount of short glass fiber is changed to 76 Kg. The temperature of the heat treatment is 340° C. and the heat treatment lasts 45 minutes.

What is claimed is:

1. An all plastic boat hull comprised of
   an outer surface layer and
   an inner surface layer and
   a cavity portion defined by said outer surface layer and said inner surface layer, said cavity portion containing a plastic foaming material,
   wherein said outer surface layer and said inner surface layer are made of physically modified resin which is comprised of
   a resin as the main raw material,
   a powdery additive and
   a filler;
   wherein said physically modified resin has in terms of the weight of the resin 1% to 10% short glass fibre and other fibre are added,
   such fibre and resin being used for preparing physically modified plastic crude powder material after being pelletized.

2. An all plastic boat hull as claimed in claim 1, characterized in that said resin material is polyolefins material, especially linear low density polyethylene (LLDPE) and low density polyethylene (LDPE).

3. An all plastic boat hull as claimed in claim 1, characterized in that the entire boat is formed in a single step and comprises a cellar, a cabin and a port, but utilizes no welding.

4. A plastic boat hull as claimed in claim 1, characterized in that the thickness of different positions on the hull are selected based on the theoretical thickness requirement of the hull design with the thickness difference reaching 20 mm.

5. A process for manufacturing a plastic boat comprising the following steps: positioning a "sealed container boat mold onto a rotational forming system which can rotate and rock, and can heat the mold;
   adding a plastic powder material in the mold;
   subjectinq the mold to heat such that said material is melted and plasticized layer by layer;
   subjecting said mold to a complex motion comprising circular and semicircular rotations of 180°–360° and positional rocking of selected angles such that said melted material coats strictly on the inner surface of the mold to form an inner plastic layer of a desired thickness; and
   cooling and releasing said formed inner plastic layer "sealed container boat from said mold to produce an all-plastic boat.

6. A process for manufacturing all-plastic boat according to claim 5, characterized in that ideal thickness can be obtained by means of selective controlling of the application of heat at different positions based on the different desirable thicknesses at different parts of the hull.

7. A plastic boat hull wherein the hull including an outer surface layer, an inner surface layer and a cavity defined by said outer and inner surface layers, characterized in said outer surface layer and inner surface layer made of a physically modified resin comprised of a resin as main raw material to be added with a powdery additive and a filler, wherein said physically modified resin to be added with a small amount of short glass fiber or other fiber, such fiber together with said physically modified resin are pelletized to form a physically modified resin material, said cavity being at least partially filled with a foaming material.

8. A plastic boat hull as claimed in claim 7, characterized in that it may contain divisional cavities, open compartments and closed compartments without welding, said divisional cavities may be filled with a foaming material.

9. A plastic boat hull as claimed in claim 8 characterized in that said resin is selected from the group consisting of polyolefins, polyvinyl chlorides, polyamides, nylons and polyesters.

10. A plastic boat hull as claimed in claim 9, characterized in that said polyolefin is a linear low density polyethyllene (LLDPE) or low density polyethylene (LDPE).

11. A plastic boat hull as claimed in claim 10, characterized in that said physically modified resin includes from 1% to about 40% on the basis of the resin weight, of short glass fiber.

12. A plastic boat hull as claimed in claim 9, characterized in that said physically modified resin includes from 1% to about 40% on the basis of the resin weight, of short glass fiber.

13. A plastic boat hull as claimed in claim 7, characterized in that said physically modified resin includes from 1% to about 40% on the basis of the resin weight, of short glass fiber.

14. A plastic boat hull as claimed in claim 7, characterized in that said resin is selected from the group consisting of polyolefins, polyvinyl chlorides, polyamides, nylons and polyesters.

15. A process for making said plastic boat hull claimed in claim 9, said process comprising the following steps:
   placing "a closed container type" boat mold onto a rotational molding machine which can rotate and rock and can heat said mold;
   adding batchwise said physically modified resin material to said mold;
   subjecting said mold to heat such that said material is melted and plasticized layer by layer,
   subjecting said mold to a complex motion comprising circular and semicircular rotations of 180°–360° degrees and rocking of certain positional angles such that said melted material coats strongly on the inner surface of the mold to form a resinous layer of a desired thickness;
   cooling and releasing said mold to produce said plastic hull.

16. A preparation process as claimed in claim 15, characterized in that the desired thickness of said hull at a part of said hull is obtained by controlling the heat at different positions based on the different thickness at different parts of the hull.

* * * * *